Patented July 19, 1927.

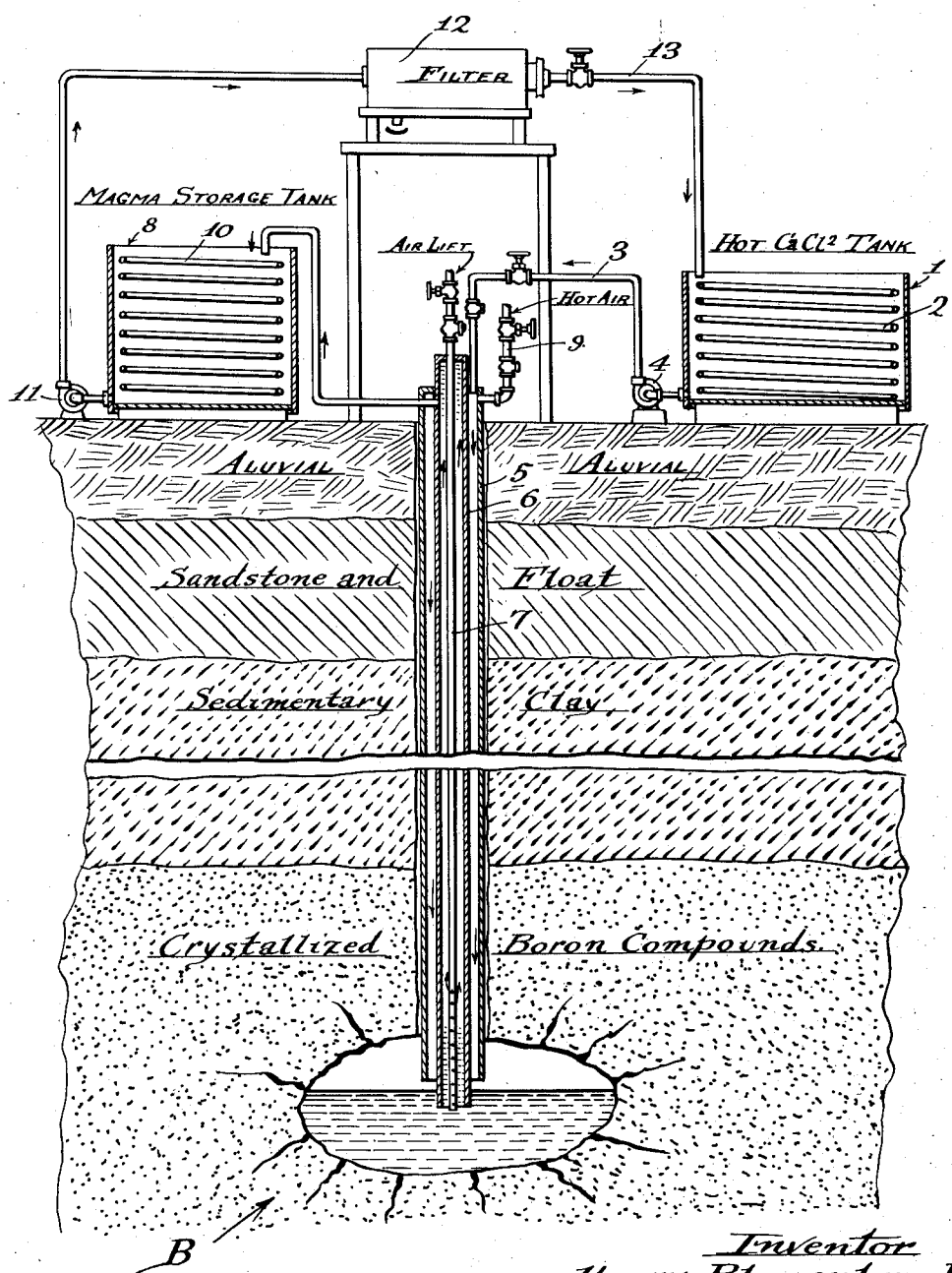

1,636,455

UNITED STATES PATENT OFFICE.

HENRY BLUMENBERG, JR., OF MOAPA, NEVADA.

PROCESS OF MINING INSOLUBLE BORON COMPOUNDS.

Application filed March 23, 1927. Serial No. 177,520.

My invention relates to a process of mining insoluble calcium boron compounds such as colemanite

$$2CaO.3B_2O_3.5H_2O$$

and ulexite

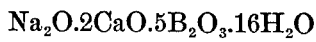
$$Na_2O.2CaO.5B_2O_3.16H_2O$$

when they occur in underground deposits.

In my process I make use of my discovery that calcium chloride, especially when heated, is capable of dissolving a large percentage of calcium boron compounds which are normally substantially insoluble in water.

The invention contemplates a method of recovering the insoluble calcium boron compounds mentioned by means of a hot calcium chloride solution which I have discovered will disintegrate the insoluble calcium boron compounds substantially insoluble in water and also dissolve an appreciable percentage thereof. The magma consisting of calcium chloride, calcium boron compound in solution, and the disintegrated undissolved particles thereof are pumped to the surface. The mixture is then cooled. The cooling will cause a part of the dissolved boron compounds to crystalize out and the mixture is then passed through a filter and the calcium chloride solution containing a percentage of calcium boron compounds in solution is reheated and again caused to be applied to the undissolved boron compounds in the next cycle of operation.

The filter cake, separated from the calcium chloride solution, contains both the crystallized and the undissolved boron compound and is then treated in any preferred manner to convert the same into either borax or boric acid, as desired.

My invention consists of the steps of the process hereinafter described and claimed.

In the accompanying drawings, which form a part of the specification, I have shown, in diagram, an apparatus suitable for carrying out my process.

Referring to the drawings, B indicates a deposit of insoluble calcium boron compound such as colemanite or ulexite. 1 indicates a storage reservoir containing a calcium chloride solution, preferably containing from 5 to 20 per cent of calcium chloride. Tank 1 is provided with suitable heating coils 2 to heat the calcium chloride solution up to 200° F. A pipe 3 in which a pump 4 is located conducts the calcium chloride solution through a well casing 5 extending from the ground to the mineral deposit B. The hot calcium chloride solution, on contact with the boron compounds B, will dissolve from 1 to 10 per cent thereof by weight compared with the calcium chloride solution.

Within the casing 5 is a pump casing 6 containing an air lift tube 7 which lifts the magma from the bottom of the well to a magma storage tank 8. In the annular space between interior pipe 6 and air lift tube 7 I introduce compressed air, preferably hot, by means of a valve controlled air pipe 9 which serves to force the magma at the bottom of the well into the inner pipe 6 to make it accessible to the action of the air lift tube 7. The storage tank 8 may be provided with cooling coils 10. From the storage tank 8 the magma is pumped by means of pump 11 through filter presses 12. The filtrate is conducted from the filter presses 12 by means of pipes 13 to the hot calcium chloride tank 1 to re-enter the cycle of operation.

The operation is as follows:

Calcium chloride solution containing from 5 to 20 per cent of calcium chloride is heated up to 200° F. in storage tank 1 and then pumped to the boron deposit where it will disintegrate from 1 to 5 per cent of the boron compound and dissolve from 1 to 20 per cent of the boron compounds, the magma forming a milky liquid which is lifted to the surface of the ground by means of air lift 7 or any other preferred means to the magma storage tank 8 where it is cooled down to 40 to 50° F. which will cause a portion of the dissolved boron compound to crystallize out. The disintegrated boron compound as well as the crystallized boron compounds are then retained in the filter cake by the filter presses 12, while the calcium chloride solution which will contain from 5 to 10 per cent of the boron compound in solution, is conveyed to the hot calcium chloride storage tank 1 to be again re-heated and used for the next cycle of operation.

The filter cake, consisting of a calcium boron compound, is then treated in any suitable manner for the recovery of borax, boric acid or any other boron compound desired.

In place of calcium chloride magnesium chloride may be used, but calcium chloride is preferable, for the reason that it is inexpensive and more efficient in dissolving the calcium boron compounds normally insoluble in water.

It will be understood that various changes may be made in the steps of the process by those skilled in the art without departing from the spirit of my invention as claimed.

I claim:

1. A method of mining water insoluble calcium boron compounds comprising introducing a hot calcium chloride solution to the calcium boron deposit, thereby disintegrating and dissolving a portion thereof, removing and cooling the resulting magma, thereby causing a portion of the dissolved calcium boron compounds to precipitate and removing the soluble part from the insoluble part of the magma, said soluble part containing calcium chloride and a small percentage of calcium boron compounds in solution.

2. A method of mining water insoluble calcium boron compounds comprising introducing a hot calcium chloride solution to the calcium boron deposit, thereby disintegrating and dissolving a portion thereof, removing and cooling the resulting magma, thereby causing a portion of the dissolved calcium boron compounds to precipitate and removing the soluble part from the insoluble part of the magma, said soluble part containing calcium chloride and a small percentage of calcium boron compounds in solution, heating the same and using the same for the next cycle of operation.

3. A method of mining water insoluble boron compounds comprising introducing a hot calcium chloride solution to the boron deposit, thereby disintegrating and dissolving a portion thereof, removing and cooling the resulting magma, thereby causing a portion of the dissolved boron compounds to precipitate and removing the soluble part from the insoluble part of the magma, said soluble part containing calcium chloride and a small percentage of boron compounds in solution.

4. A method of mining water insoluble boron compounds comprising introducing a hot calcium chloride solution to the boron deposit, thereby disintegrating and dissolving a portion thereof, removing and cooling the resulting magma, thereby causing a portion of the dissolved boron compounds to precipitate and removing the soluble part from the insoluble part of the magma, said soluble part containing calcium chloride and a small percentage of boron compounds in solution, heating the same and using the same for the next cycle of operation.

In testimony whereof I have signed my name to this specification.

HENRY BLUMENBERG, Jr.